(12) United States Patent
Agrawal et al.

(10) Patent No.: US 10,855,841 B1
(45) Date of Patent: Dec. 1, 2020

(54) SELECTIVE CALL NOTIFICATION FOR A COMMUNICATION DEVICE

(71) Applicant: QUALCOMM Incorporated, San Diego, CA (US)

(72) Inventors: Arpit Agrawal, Hyderabad (IN); Arun Kumar Singh, Sonbhadra (IN); Shankar Anand, Hyderabad (IN); Murali Krishna Busanaboyina, Vijayawada (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/663,013

(22) Filed: Oct. 24, 2019

(51) Int. Cl.
| | | |
|---|---|---|
| *H04M 3/42* | (2006.01) | |
| *H04M 3/436* | (2006.01) | |
| *H04M 3/533* | (2006.01) | |
| *H04M 3/48* | (2006.01) | |
| *H04M 3/487* | (2006.01) | |
| *H04M 3/428* | (2006.01) | |

(52) U.S. Cl.
CPC ....... *H04M 3/4365* (2013.01); *H04M 3/4288* (2013.01); *H04M 3/42374* (2013.01); *H04M 3/48* (2013.01); *H04M 3/487* (2013.01); *H04M 3/533* (2013.01)

(58) Field of Classification Search
CPC ........ H04M 3/42; H04M 3/2281; H04M 3/00; H04M 1/64; H04M 1/725; G10L 19/12; G10L 19/012; G10L 19/24; G10L 13/04; G10L 15/18; H04W 72/04; H04W 76/28; H04W 8/24; H04W 4/00; H04B 7/216; H04B 7/005; H04L 29/06; H04L 1/00; H04L 1/20; G06Q 10/063; G06Q 10/06; H04J 3/17; H04J 3/14; H04J 3/06; G06F 21/32
USPC .... 455/415, 412.1, 414.1, 41.1; 379/307.04; 704/227, 212, 220
See application file for complete search history.

(56) References Cited

U.S. PATENT DOCUMENTS

| | | | | |
|---|---|---|---|---|
| 5,960,389 A | * | 9/1999 | Jarvinen | G10L 19/012 704/215 |
| 5,991,901 A | * | 11/1999 | Mulford | H04L 1/20 455/421 |
| 6,122,271 A | * | 9/2000 | McDonald | H04J 3/17 370/345 |
| 6,167,374 A | * | 12/2000 | Shaffer | G10L 25/87 704/227 |

(Continued)

FOREIGN PATENT DOCUMENTS

| | | | | |
|---|---|---|---|---|
| KR | 101560798 B1 | * | 10/2015 | ............... H04L 1/00 |
| WO | WO-0031952 A1 | * | 6/2000 | ......... H04M 11/022 |

*Primary Examiner* — Mahendra R Patel
(74) *Attorney, Agent, or Firm* — Moore Intellectual Property Law, PLLC

(57) ABSTRACT

A first communication device includes a memory and a processor coupled to the memory. The processor is configured to receive, during a first call with a second communication device, an indication of a second call from a third communication device. The processor is further configured to monitor the first call, in response to the indication of the second call, for a pause in speech of at least a threshold duration. The processor is further configured to initiate, in response to detecting the pause in speech of at least the threshold duration, an audio message indicating call information associated with the second call.

30 Claims, 5 Drawing Sheets

(56) References Cited

U.S. PATENT DOCUMENTS

| | | | | |
|---|---|---|---|---|
| 6,169,786 B1* | 1/2001 | Dunn | H04M 3/436 | |
| | | | 379/209.01 | |
| 6,249,765 B1* | 6/2001 | Adler | G10L 15/04 | |
| | | | 379/88.03 | |
| 6,584,439 B1* | 6/2003 | Geilhufe | G06F 3/167 | |
| | | | 704/270 | |
| 7,065,099 B1* | 6/2006 | Suzuki | H04J 3/12 | |
| | | | 370/465 | |
| 7,075,918 B1* | 7/2006 | Kung | H04M 3/42323 | |
| | | | 370/352 | |
| 7,532,612 B2* | 5/2009 | Lakaniemi | H04W 56/0065 | |
| | | | 370/350 | |
| 8,041,589 B1* | 10/2011 | Blair | G06Q 10/063 | |
| | | | 705/7.11 | |
| 8,116,439 B1* | 2/2012 | Runcie | H04M 3/20 | |
| | | | 379/88.12 | |
| 9,866,683 B1* | 1/2018 | Hodge | H04L 65/1046 | |
| 9,940,944 B2* | 4/2018 | Finlow-Bates | G10L 21/0202 | |
| 10,014,006 B1* | 7/2018 | Smith | G10L 17/02 | |
| 10,044,873 B2* | 8/2018 | Tinsman | H04M 1/6008 | |
| 10,051,115 B2* | 8/2018 | Redmann | H04M 3/436 | |
| 2001/0053971 A1* | 12/2001 | Demetrescu | H04L 1/0014 | |
| | | | 704/201 | |
| 2002/0042284 A1* | 4/2002 | Benoist | H04W 52/54 | |
| | | | 455/522 | |
| 2003/0043260 A1* | 3/2003 | Yap | H04N 7/147 | |
| | | | 348/14.06 | |
| 2003/0133423 A1* | 7/2003 | LaDue | H04L 1/0071 | |
| | | | 370/330 | |
| 2005/0074107 A1* | 4/2005 | Renner | H04M 3/4211 | |
| | | | 379/202.01 | |
| 2006/0293885 A1* | 12/2006 | Gournay | G10L 19/012 | |
| | | | 704/223 | |
| 2007/0019797 A1* | 1/2007 | Morris | H04M 3/4288 | |
| | | | 379/202.01 | |
| 2007/0129022 A1* | 6/2007 | Boillot | G10L 25/69 | |
| | | | 455/90.1 | |
| 2009/0067604 A1* | 3/2009 | Apple | H04M 3/2281 | |
| | | | 379/207.04 | |
| 2010/0173618 A1* | 7/2010 | Kass | H04M 3/42221 | |
| | | | 455/414.1 | |
| 2011/0194538 A1* | 8/2011 | Zheng | H04W 76/28 | |
| | | | 370/335 | |
| 2012/0060118 A1* | 3/2012 | Gupta | A43B 3/0021 | |
| | | | 715/810 | |
| 2014/0162555 A1* | 6/2014 | Wernaers | H04W 76/28 | |
| | | | 455/41.2 | |
| 2015/0009965 A1* | 1/2015 | Maiya | H04W 72/0446 | |
| | | | 370/336 | |
| 2015/0024732 A1* | 1/2015 | Yamashita | H04W 4/16 | |
| | | | 455/419 | |
| 2016/0277952 A1* | 9/2016 | Hui | H04W 24/08 | |
| 2017/0220786 A1* | 8/2017 | Guo | G06F 21/36 | |
| 2017/0230908 A1* | 8/2017 | Agarwal | H04W 52/0209 | |
| 2018/0359349 A1* | 12/2018 | Graylin | H04M 1/7255 | |
| 2019/0180175 A1* | 6/2019 | Meteer | G06N 3/08 | |

* cited by examiner

SELECTIVE CALL NOTIFICATION FOR A COMMUNICATION DEVICE

I. FIELD

This disclosure is generally related to communication devices and more particularly to selective call notification for communication devices.

II. DESCRIPTION OF RELATED ART

Electronic devices enable users to communicate with one another in many ways. For example, an electronic device (e.g., a smart phone, a tablet, or a computer) can enable a user to access the Internet, to place and receive calls, and to send and receive messages using applications such as email and messaging services. An electronic device may alert a user to an incoming call or message using an audio notification (e.g., a ringtone), a visual notification via a graphical user interface (GUI), another technique, or a combination thereof.

In some cases, notifications are disruptive to users. For example, a notification received during a telephone conversation may be disruptive to participants of the telephone conversation, as the recipient of the call may pause the conversation to visually check the GUI of the electronic device for a phone number or contact information associated with the calling party. Further, in some situations, the calling party may place several calls to the recipient, increasing disruption to participants of the telephone conversation and potentially frustrating the calling party. In some cases, the disruption can reduce business productivity, such as by causing distraction in the workplace.

Further, certain conventional techniques for reducing such disruption can be ineffective or counterproductive in some situations. For example, a user may place a communication device in a silent mode where notifications are suppressed. The user may forget to re-enable notifications, or the user may miss an important call that the user would have answered during the telephone conversation if a notification had been provided.

III. SUMMARY

In an illustrative example, a first communication device includes a memory and a processor coupled to the memory. The processor is configured to receive, during a first call with a second communication device, an indication of a second call from a third communication device. The processor is further configured to monitor the first call, in response to the indication of the second call, for a pause in speech of at least a threshold duration. The processor is further configured to initiate, in response to detecting the pause in speech of at least the threshold duration, an audio message indicating call information associated with the second call.

In another example, a method of operation of a communication device includes receiving, during a first call between a first communication device and a second communication device, an indication of a second call from a third communication device. The method further includes monitoring the first call, in response to the indication of the second call, for a pause in speech of at least a threshold duration. The method further includes generating, in response to detecting the pause in speech of at least the threshold duration, an audio message indicating call information associated with the second call.

In another example, a computer-readable medium stores instructions executable by one or more processors to perform operations. The operations include receiving, during a first call between a first communication device and a second communication device, an indication of a second call from a third communication device. The operations further include monitoring the first call, in response to the indication of the second call, for a pause in speech of at least a threshold duration. The operations further include generating, in response to detecting the pause in speech of at least the threshold duration, an audio message indicating call information associated with the second call.

In another example, an apparatus includes means for receiving, during a first call between a first communication device and a second communication device, an indication of a second call from a third communication device. The apparatus further includes means for monitoring, in response to the indication of the second call, the first call for a pause in speech of at least a threshold duration. The apparatus further includes means for generating, in response to detecting the pause in speech of at least the threshold duration, an audio message indicating call information associated with the second call.

IV. BRIEF DESCRIPTION OF THE DRAWINGS

V. DETAILED DESCRIPTION

Figure 1:
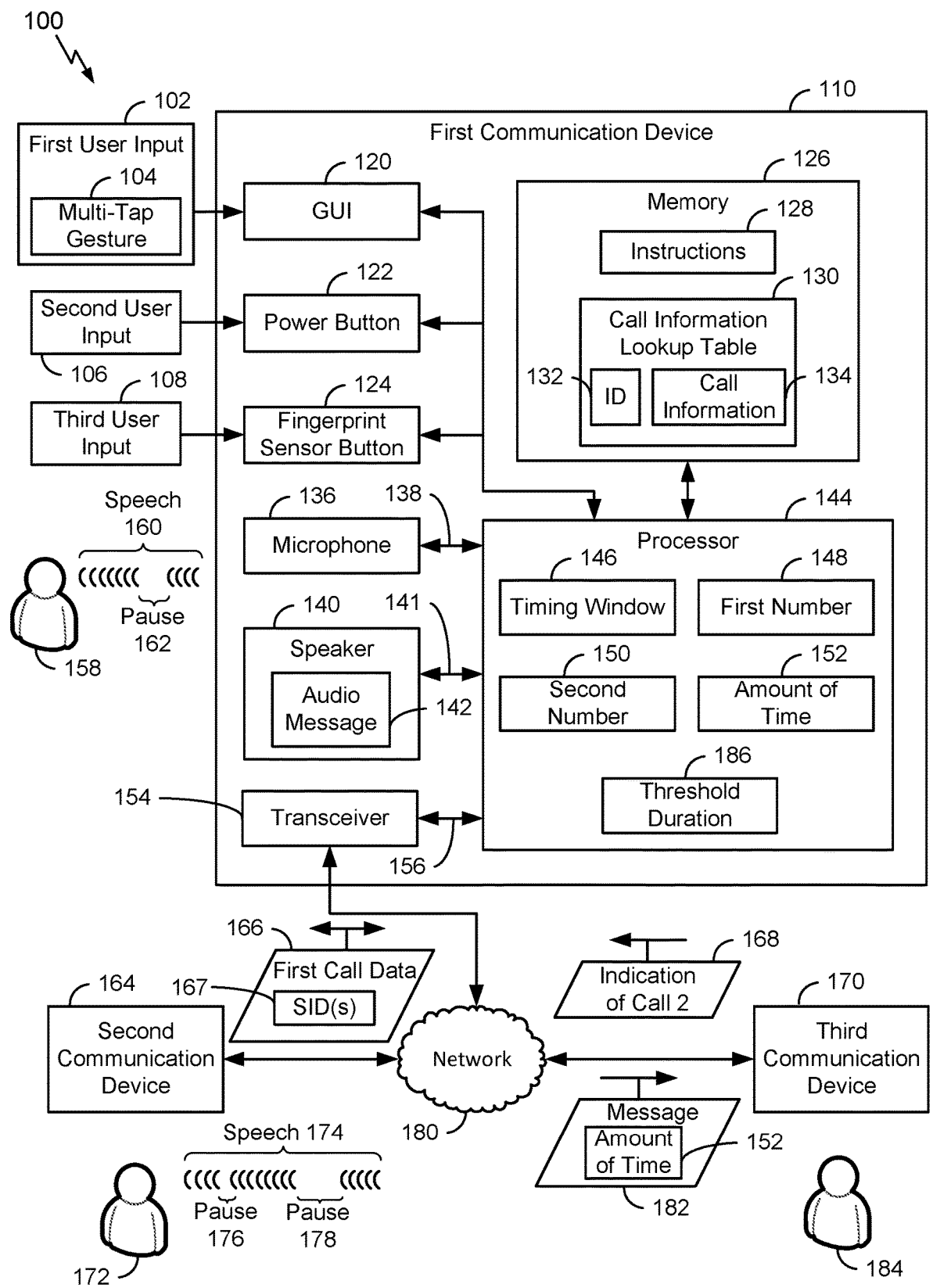
FIG. 1 is a diagram of an illustrative example of a system including at least one communication device that is configured to perform selective call notification.

An example of a communication device in accordance with aspects of the disclosure selectively provides a notification of a second call received during another a first call that is in progress at the communication device. In some examples, the communication device is configured to delay generating the notification until detecting a pause in conversation in the first call. In some implementations, the communication device is configured to detect the pause in conversation by monitoring the first call for one or more silence insertion descriptors (SIDs) of a particular communication protocol associated with the first call. Alternatively or in addition, in some examples, a processor or controller of the communication device is configured to monitor (e.g., "snoop") a bus or other component of the communication device to detect the pause in conversation, such as by monitoring a microphone bus, a speaker bus, or a transceiver bus, as illustrative examples.

In some examples, the communication device generates an audio notification announcing call information (e.g., caller identification (ID) or a phone number) associated with the second call in response to detecting a pause in conversation in the first call. As a result, interruption of the first call is avoided. Further, by generating an audio notification announcing the call information, the called party may avoid pausing conversation of the first call to visually determine the call information via a graphical user interface (GUI).

In some implementations, the first communication device is configured to perform one or more fast input operations that facilitate simplified response to the second call during the first call. For example, first user input may indicate to the first communication device that a message is to be sent to the calling party indicating an amount of time for a callback. In some implementations, the first user input corresponds to a number of taps of a multi-tap gesture (e.g., where two taps indicate a callback time of 10 minutes and three taps indicate a callback time of 15 minutes, as an illustrative example). In some implementations, the first user input causes the communication device to send a text message to the calling party (e.g., "Please call back in 10 minutes" or "Please call back in 15 minutes"). In another example, second user input may indicate to decline the second call, such as by routing the second call to a voicemail account associated with the communication device. In some implementations, the second user input corresponds to a press of a power button of the communication device. In another example, third user input may indicate to transfer from the first call to the second call (e.g., by terminating the first call and switching to the second call). In some implementations, the third user input corresponds to a press of a fingerprint sensor button of the communication device.

Particular aspects of the disclosure are described further below with reference to the drawings. In the description, common features are designated by common reference numbers. Various terminology is used for the purpose of describing particular implementations only and is not intended to be limiting of implementations. For example, the singular forms "a," "an," and "the" are intended to include the plural forms as well, unless the context clearly indicates otherwise. The terms "comprises" and "comprising" are used interchangeably with "includes" or "including." Additionally, the term "wherein" is used interchangeably with "where." As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

Referring to FIG. 1, a particular example of a system that is configured to perform selective call notification is depicted and generally designated 100. The system 100 includes a first communication device 110, a second communication device 164, and a third communication device 170. In some examples, one or more of the communication devices 110, 164, and 170 correspond to mobile communication devices (e.g., mobile phones).

The communication devices 110, 164, and 170 are configured to communicate using one or more networks, such as a network 180. In some examples, the network 180 includes a packet-switched network, a circuit-switched network, a wireless network, a wired network, a public-switched telephone network (PSTN), another network, or a combination thereof. To further illustrate, in some examples, the network 180 includes a network that operates in accordance with a Global System for Mobile Communications (GSM) communication protocol, a network that operates in accordance with a code division multiple access (CDMA) communication protocol (e.g., a wideband CDMA (WCDMA) communication protocol), or a network that operates in accordance with a Voice over Long-Term Evolution (VoLTE) communication protocol, as illustrative examples.

In the example of FIG. 1, the first communication device 110 includes a memory 126 configured to store instructions 128. The first communication device 110 further includes one or more processors, referred to as processor 144, coupled to the memory 126. The processor 144 is configured to execute the instructions 128 to perform, initiate, or control one or more operations described herein.

In FIG. 1, the first communication device 110 is configured to generate a graphical user interface (GUI) 120. For example, the first communication device 110 may include a display configured to present the GUI 120 in response to commands from the processor 144. FIG. 1 also depicts that the first communication device 110 includes one or more buttons, such as a power button 122 and a fingerprint sensor button 124. In FIG. 1, the first communication device 110 further includes a microphone 136, a speaker 140, and a transceiver 154. It is noted that one or both of the communication devices 164, 170 can include one or more components that are analogous to components described with reference to the first communication device 110.

Each component of the first communication device 110 can be coupled to one or more other components of the first communication device 110 via one or more buses or other connections. To illustrate, in some examples, the microphone 136 is coupled to the processor 144 via a microphone bus 138. As additional examples, in some implementations, the speaker 140 is coupled to the processor 144 via a speaker bus 141, and the transceiver 154 is coupled to the processor 144 via a transceiver bus 156.

During operation, the first communication device 110 is configured to perform operations of a first call with the second communication device 164. As used herein, a call may include an audio-based communication session, such as a telephone call, as well as a video-based communication session, such as a video chat or a video conference, as illustrative examples.

In some examples, the first call is initiated by the processor 144 of the first communication device 110 (e.g., in response to input from a first user 158, such as via a dialer application). In another example, the first call is initiated by the second communication device 164 (e.g., in response to input from a second user 172, such as via a dialer application). During the first call, the first communication device 110 may send call data to the second communication device 164, receive call data from the second communication device 164, or both. To further illustrate, FIG. 1 depicts first call data 166 associated with the first call. In some examples, the transceiver 154 is configured to send the first call data 166 to the second communication device 164 or to receive the first call data 166 from the second communication device 164. In some examples, the first call data 166 includes data representing speech 160 of the first user 158 or speech 174 of the second user 172.

The processor 144 is configured to receive, during the first call, an indication 168 of a second call from the third communication device 170. To illustrate, a third user 184 of the third communication device 170 may provide user input to the third communication device 170 (e.g., via a dialer application) to initiate the second call and to send the indication 168 to the first communication device 110 (or to a phone number associated with the first communication device 110). The indication 168 may include or correspond to a request for the first communication device 110 to accept the second call from the third communication device 170 (e.g., by connecting the first communication device 110 to the third communication device 170 via a packet-switched connection, a circuit-switched connection, or both). In some examples, the indication 168 includes a caller identification (ID) associated with the third communication device 170, the third user 184, or both. In other examples, no caller ID is supplied with the indication 168. In some examples, the first communication device 110 is configured to detect calls (e.g., the second call) by receiving indications (e.g., the indication 168) from a radio tower and a base station that are associated with or coupled to the network 180. Alternatively or in addition, the first communication device 110 may be configured to detect calls (e.g., the second call) using one or more other techniques, such as by receiving indications (e.g., the indication 168) from a modem or wireless router that is associated with or coupled to the network 180.

In some implementations, the first communication device 110 is configured to determine, in response to receiving the indication 168, whether a phone call is being conducted at the first communication device 110. For example, an operating system of the first communication device 110 may detect a state of a dialer application of the first communication device 110 to detect whether a phone call is in progress at the first communication device 110. If no call is being conducted (e.g., if the indication 168 is received after termination of the first call with the second communication device 164), then the first communication device 110 may provide an alert associated with the second call, such as by generating an audio alert (e.g., via the speaker 140), by generating a visual alert (e.g., via the GUI 120), by performing one or more other operations, or a combination thereof.

Alternatively, if the first communication device 110 detects that a phone call (e.g., the first call) is in progress at the first communication device 110, then the first communication device 110 may perform selective call notification associated with the second call. To illustrate, the processor 144 is configured to monitor the first call, in response to the indication 168 of the second call, for a pause in speech of at least a threshold duration 186 (e.g., a threshold number of seconds (s) or milliseconds (ms), as an illustrative example).

In some cases, the first communication device 110 is configured to monitor the first call for a particular indication or a particular packet associated with a communication protocol associated with the first call. As an example, a particular communication protocol may use a silence compression technique to encode silence (or sound that is less than a particular threshold) in one or more packets of the first call data 166. In some examples, the first call data 166 includes one or more silence insertion descriptors (SIDs) 167 associated with a particular communication protocol, such as a Real-time Transport Protocol (RTP), as a non-limiting illustrative example.

In some cases, the processor 144 is configured to count a duration associated with the one or more SIDs 167 to detect a pause in conversation of the first call. For example, in some communication protocols, a period of silence may be indicated by inserting consecutive SIDs of the one or more SIDs 167 in the first call data 166. In this example, the processor 144 may be configured to count a number of the consecutive SIDs to detect a pause in conversation of the first call, and the threshold duration 186 may correspond to a threshold number of SIDs. In another example, a period of silence may be indicated using one SID of the one or more SIDs 167 having a particular field (e.g., a payload) indicating a duration of the silence. In this example, the processor 144 may be configured to parse the field (or payload) to detect the duration, and the threshold duration 186 may correspond to a threshold duration of silence to be compared to the duration of silence indicated by an SID.

In some examples, the processor 144 is configured to monitor the speech 160 of the first user 158 for a pause 162 that satisfies (e.g., is greater than) the threshold duration 186. To further illustrate, in some examples, the processor 144 is configured to monitor (e.g., "snoop") the microphone bus 138 to detect a pause in speech of the first user 158.

Alternatively or in addition to monitoring speech of the first user 158, in some examples, the processor 144 is configured to monitor the speech 174 of the second user 172 for a pause that satisfies the threshold duration 186. To further illustrate, in FIG. 1, the speech 174 of the second user 172 includes a pause 176 and a pause 178 having a greater duration than the pause 176. In some examples, the pause 178 satisfies the threshold duration 186, and the pause 176 fails to satisfy the threshold duration 186. In some implementations, the processor 144 is configured to monitor (e.g., "snoop") the speaker bus 141 to detect a pause in speech of the second user 172.

In some examples, the processor 144 is configured to monitor speech of both the users 158, 172 to detect a pause that satisfies the threshold duration 186. In a particular example, the processor 144 is configured to monitor (e.g., "snoop") the transceiver bus 156 to detect a pause in speech of the first user 158, the second user 172, or both. To further illustrate, in some circumstances, the processor 144 may be configured to detect simultaneous or overlapping pauses in the speech 160 and the speech 174 by monitoring both the microphone bus 138 and the speaker bus 141 or by monitoring the transceiver bus 156.

The processor 144 is further configured to initiate, in response to detecting a pause in speech of at least the threshold duration 186, an audio message 142 (e.g., a call notification announcing the second call). The audio message 142 indicates call information 134 associated with the second call. In a particular illustrative example, the processor 144 is configured to execute the instructions 128 to provide an audio interface (e.g., an audio-based virtual assistant) to the first user 158, and the audio message 142 is played via the audio interface. In some examples, the audio message 142 is played using the speaker 140.

In some examples, the call information 134 includes a contact name that is associated with the third user 184 and stored at the first communication device 110. Alternatively or in addition, the call information 134 may include a phone number of the third communication device 170 or a location associated with the phone number (e.g., a location indicated by an area code or a country code of the phone number). In other cases, the call information 134 may indicate that no identification information is available for the third communication device 170 (e.g., by indicating that no caller ID is available).

In some examples, the processor 144 is configured to perform a lookup operation to access the call information 134 from a call information lookup table 130 (e.g., by accessing the call information 134 based on a caller identification (ID) 132 that may be specified by the indication 168 in some examples). For example, the processor 144 may be configured to access the call information 134 in response to detecting a pause in speech of at least the threshold duration 186. In another example, the processor 144 is configured to access the call information 134 in response to receiving the indication 168 of the second call and prior to detecting a pause in speech of at least the threshold duration 186.

In some implementations, the processor 144 is configured to delay providing the call information 134 to the first user 158 until detection of a pause in speech of at least the threshold duration 186. Delaying presentation of the call information 134 to the first user 158 may reduce or avoid interrupting conversation between the first user 158 and the second user 172 (e.g., by providing the call information 134 during a pause in the conversation).

In some implementations, the processor 144 is configured to monitor the first call during a timing window 146 (e.g., a particular length of time) for a pause in conversation of at least the threshold duration 186. As a non-limiting illustrative example, the timing window 146 may correspond to x seconds, and the threshold duration 186 may correspond to y seconds, where x is a positive integer, and where y is a positive integer that is less than or equal to x. In this example, in response to the indication 168 of the second call, the processor 144 may monitor the first call for x seconds to identify a pause in conversation of at least y seconds.

In some cases, the processor 144 may fail to identify, during the timing window 146, a pause in conversation of at least the threshold duration 186 (e.g., during a lively conversation between the first user 158 and the second user 172). In some examples, the processor 144 is configured to decline the second call in response to failing to detect a pause in speech within the timing window 146 of at least the threshold duration 186. In a particular example, the processor 144 is configured to decline the second call without providing, during the first call, an alert (e.g., a beep) indicating the second call. To further illustrate, in some examples, the processor 144 is configured to decline the second call without providing the call information 134 during the first call (e.g., without generating the audio message 142 during the first call). Declining the second call without providing the call information 134 during the first call may reduce or avoid interrupting conversation between the first user 158 and the second user 172 (e.g., by avoiding interrupting the first user 158 or the second user 172 to provide a beep or other noise indicating the second call). As used herein, declining the second call may include avoiding connecting the first communication device 110 to the third communication device 170, routing the second call to a voicemail account associated with the first communication device 110 (e.g., via a packet-switched connection, a circuit-switched connection, or both), or a combination thereof.

In some examples, the processor 144 is configured to detect termination of the first call and to provide the call information 134 (e.g., via a missed call notification) after termination of the first call. As an example, the processor 144 may detect input at the first communication device 110 (e.g., via input from the first user 158 using the GUI 120) terminating the first call. As another example, the processor 144 may detect termination of the first call by the second communication device 164 (e.g., after hanging up by the second user 172). Upon detecting termination of the first call, the processor 144 may provide the call information 134 using an audio message (e.g., the audio message 142 or another audio message), using the GUI 120, or a combination thereof.

In connection with certain aspects of the disclosure, upon generating the audio message 142 during the first call, the first communication device 110 is configured to receive user input during the first call indicating whether to temporarily continue the first call (e.g., by performing a "soft" decline of the second call), to decline the second call (e.g., by performing a "hard" decline of the second call), or to perform a switch from the first call to the second call. In an illustrative example, the first communication device 110 is configured to receive user input via one or more "fast input" operations that may be quickly performed by the first user 158 with minimal or reduced disruption to the first call. In some examples, the fast input operations may be performed by the first user 158 in response to the audio message 142.

In an example of a first fast input operation, the processor 144 is configured to detect first user input 102 during the first call and after generating the audio message 142 during the first call. In some examples, the processor 144 is configured to send, based on the first user input 102, a message 182 to the third communication device 170 requesting a callback in a particular amount of time 152.

To further illustrate, in a particular example, the first user input 102 corresponds to a first number 148 of taps of a multi-tap gesture 104, and the processor 144 is configured to determine the particular amount of time 152 based on the first number 148 of taps, such as by multiplying the first number 148 by a second number 150 that is a positive number. As used herein, the multi-tap gesture 104 may include or correspond to an action by the first user 158 using one or more fingers to perform one or more gestures including multiple finger taps to the first communication device 110. As a non-limiting illustrative example, the first user 158 may perform two taps of the multi-tap gesture 104 to request a callback in 10 minutes. In this particular example, the second number 150 is equal to five. As another non-limiting illustrative example, in another implementation, the first user 158 may perform three taps of the multi-tap gesture 104 to request a callback in thirty minutes. In this example, the second number 150 is equal to ten.

In some implementations, the first user input 102 is received via the GUI 120. For example, the multi-tap gesture 104 may be detected using the GUI 120 (or a display that presents the GUI 120, such as a touchpad portion of the display that receives user input at the GUI 120). In other examples, the first user input 102 can be received at another portion of the first communication device 110. As a particular example, the first communication device 110 may optionally include a touch port that is reserved for multi-tap gestures, such as the multi-tap gesture 104. In some examples, the touch port is positioned on the rear of the first communication device 110 to enable the first user 158 to perform the multi-tap gesture 104 without removing the first communication device 110 from the ear of the first user 158.

In an example of a second fast input operation, the processor 144 is configured to detect second user input 106 during the first call and after initiating the audio message 142. In some implementations, the processor 144 is configured to decline the second call based on the second user input 106 (e.g., by routing the second call to a voicemail account associated with the first communication device 110). In some examples, the second user input 106 corresponds to a press (e.g., a short press) of the power button 122. For example, a short press of the power button 122 may have a press duration that is less than a press duration of a hard press of the power button 122 that turns off the first communication device 110.

In an example of a third fast input operation, the processor 144 is configured to detect third user input 108 after initiating the audio message 142 and to accept the second call based on the third user input 108. As a particular example, the third user input 108 may correspond to a press (e.g., a hard press) of the fingerprint sensor button 124. For example, a hard press of the fingerprint sensor button 124 may have a press duration that is greater than a press duration of a soft press of the fingerprint sensor button 124 that initiates another operation at the first communication device 110. In some examples, the third user input 108 causes the processor 144 to transfer operation of the first communication device 110 from the first call to the second call (e.g., by terminating the first call and by accepting the second call). In another example, the third user input 108 causes the processor 144 to place the first call on hold while the second call is active and until the second call is terminated (or until user input is received to return to the first call). As used herein, accepting the second call may include connecting the first communication device 110 to the third communication device 170 (e.g., via a packet-switched connection, a circuit-switched connection, or both) and terminating the first call (or placing the first call on hold).

It is noted that one or more parameters described herein can be user-configurable. As an example, "sensitivity" of a selective call notification technique can be adjusted (e.g., via an operating system of the first communication device 110), such as by enabling the first user 158 to adjust a duration of the timing window 146, to adjust the threshold duration 186, or both, as illustrative examples. As another example, in some implementations, buttons or input devices associated with the first user input 102, the second user input 106, and the third user input 108 are configurable by the first user 158 (e.g., where the first user 158 can reassign the second user input 106 from a soft press of the power button 122 to a hard press of the fingerprint sensor button 124, as an illustrative example). As an additional example, in some implementations, the first user 158 can configure an amount of time associated with each tap of the multi-tap gesture 104 or a value of the second number 150. To illustrate, the first user 158 may change a duration associated with a tap from indicating five minutes to indicating two minutes or ten minutes and may change the second number 150 from five to ten.

Although certain operations may be described herein as being performed a single time, it is noted that an operation may be performed multiple times without departing from the scope of the disclosure. For example, although detection of a pause in conversation of the first call has been described as a single operation, in some implementations, detecting a pause in conversation in the first call includes multiple operations. As an illustrative example, the processor 144 may initiate multiple queries of a component (e.g., any of the microphone bus 138, the speaker bus 141, or the transceiver bus 156) to detect a pause in conversation of the first call.

As another illustrative example, a first operation may be performed during the first call to detect a first pause in conversation of at least the threshold duration 186 during the timing window 146. In response to detecting the first pause, a lookup operation may be performed to determine the call information 134 in response, and the audio message 142 may be queued in a buffer. After queuing the audio message 142, a second operation may be performed to detect a second pause in conversation of at least the threshold duration 186 during the timing window 146. In response to detecting the second pause, the audio message 142 may be output from the buffer and played (e.g., using the speaker 140). Alternatively, if no second pause is detected in the first call, the audio message 142 may be dropped from the buffer (e.g., by invalidating, deleting, or overwriting the audio message 142 at the buffer). In some cases, queuing the audio message 142 at the buffer and then detecting a second pause may ensure that the audio message 142 is played during a pause in conversation (e.g., by avoiding a situation in which conversation is resumed while the call information 134 is accessed, which may result in the audio message 142 being played after the conversation is resumed).

In other implementations, if no second pause is detected in the first call, the audio message 142 is played at the first communication device 110 using an adjusted volume setting. For example, the audio message 142 may be played using a lowered volume setting in response to failing to detect a second pause (as compared to a louder volume setting used to play the audio message 142 in response to detecting the second pause in the first call). In some cases, use of the lowered volume setting reduces disruption to the first call (e.g., by reducing or avoiding "talking over" of the first user 158 due to playing of the audio message 142). Certain aspects of an example of a volume setting operation are described further with reference to FIG. 3.

One or more examples described with reference to FIG. 1 improve user experience during a call. For example, by delaying announcing the call information 134 until a pause in conversation is detected in the first call, interruption of conversation within the first call is reduced or avoided. As another example, one or more fast input operations described with reference to FIG. 1 enable the first user 158 to quickly and easily address (e.g., instruct the first communication device 110 to handle) the second call (e.g., without requiring the first user 158 to visually determine the call information 134 via the GUI 120).

Figure 2:
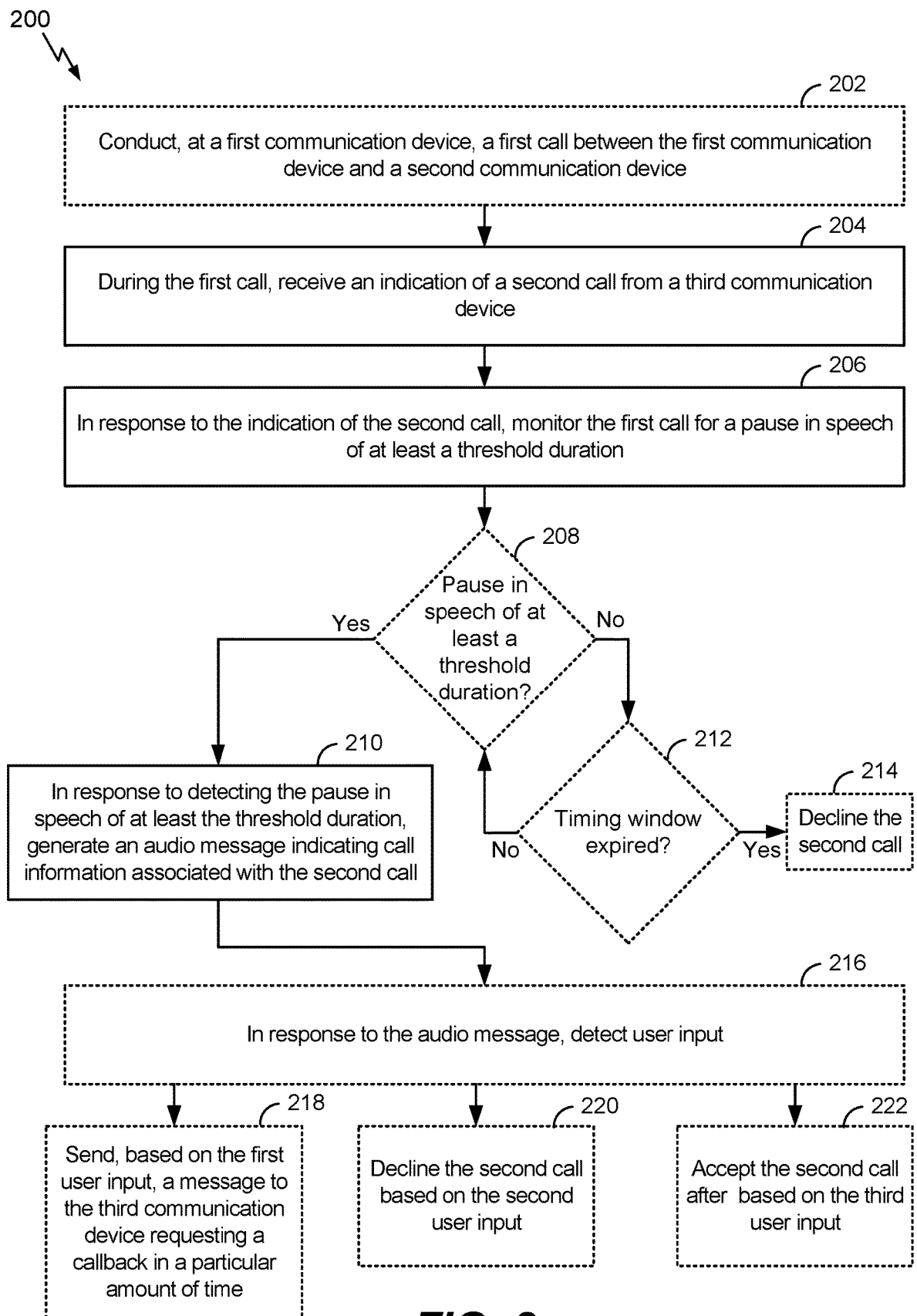
FIG. 2 is a flow chart of an illustrative example of a method of operation of a communication device of the system of FIG. 1.

Referring to FIG. 2, a particular example of a method operation of a communication device is depicted and generally designated 200. In a particular example, operations of the method 200 are performed by the first communication device 110 of FIG. 1 (e.g., a mobile communication device). In some examples, one or more operations of the method 200 are initiated, performed, or controlled by the processor 144 of FIG. 1.

The method 200 may include conducting, at a first communication device, a first call between the first communication device and a second communication device, at 202. To illustrate, the first communication device 110 may send the first call data 166 to the second communication device 164 during the first call or may receive the first call data 166 from the second communication device 164 during the first call.

The method 200 further includes receiving, during the first call, an indication of a second call from a third communication device, at 204. For example, the first communication device 110 may receive the indication 168 of the second call from the third communication device 170 during the first call.

The method 200 further includes monitoring the first call, in response to the indication of the second call, for a pause in speech of at least a threshold duration, at 206. For example, the first communication device 110 may monitor the first call for a pause in speech (e.g., the pause 162 or the pause 178) of at least the threshold duration 186. To further illustrate, in some examples, monitoring the first call includes monitoring the microphone bus 138 for the pause in speech. Alternatively or in addition, in another example, monitoring the first call includes monitoring the speaker bus 141 for the pause in speech. Alternatively or in addition, in another example, monitoring the first call includes monitoring the transceiver bus 156 for the pause in speech.

If no pause in speech of at least the threshold duration is detected, at 208, the method 200 may further include determining whether a timing window has expired, at 212. For example, the first communication device 110 may monitor the first call for a pause in speech of at least the threshold duration 186 during the timing window 146.

While the timing window is unexpired, the method 200 may continue, at 208. In response to detecting expiration of the timing window, the method 200 may further include declining the second call, at 214. For example, the second call may be routed to a voicemail account associated with the first communication device 110.

In response to detecting a pause in speech of at least the threshold duration, at 208, the method 200 further includes generating an audio message indicating call information associated with the second call, at 210. For example, the first communication device 110 may play the audio message 142 (e.g., using the speaker 140) indicating the call information 134 associated with the second call.

The method 200 may further include detecting user input after initiating the audio message, at 216. For example, the user input may correspond to the first user input 102, the second user input 106, or the third user input 108, as illustrative examples.

In some examples, the method 200 includes sending, based on user input, a message to the third communication device requesting a callback in a particular amount of time, at 218. For example, the first communication device 110 may send the message 182 to the third communication device 170 requesting a callback in the particular amount of time 152. In an illustrative example, the user input is the first user input 102 and corresponds to the first number 148 of taps of the multi-tap gesture 104, and determining the particular amount of time 152 includes multiplying the first number 148 by the second number 150.

In another example, the method 200 includes declining the second call based on the user input, at 220. In some examples, the first communication device 110 declines the second call by routing the second call to a voicemail account associated with the first communication device 110. In a particular example, the user input is the second user input 106 and corresponds to a press of the power button 122, and the first communication device 110 declines the second call in response to the press of the power button.

In another example, the method 200 includes accepting the second call based on the user input, at 222. For example, the first communication device 110 may accept the second call (e.g., while terminating the first call or while placing the first call on hold). In some examples, the user input is the third user input 108 and corresponds to a press of the fingerprint sensor button 124.

One or more examples described with reference to the method 200 of FIG. 2 improve user experience during a call. For example, by delaying announcing call information until a pause in conversation is detected in the first call, interruption of the first call is reduced or avoided. As another example, one or more fast input operations of the method 200 enable a user to quickly and easily address the second call (e.g., without requiring the user to visually determine the call information 134 via the GUI 120).

Figure 3:
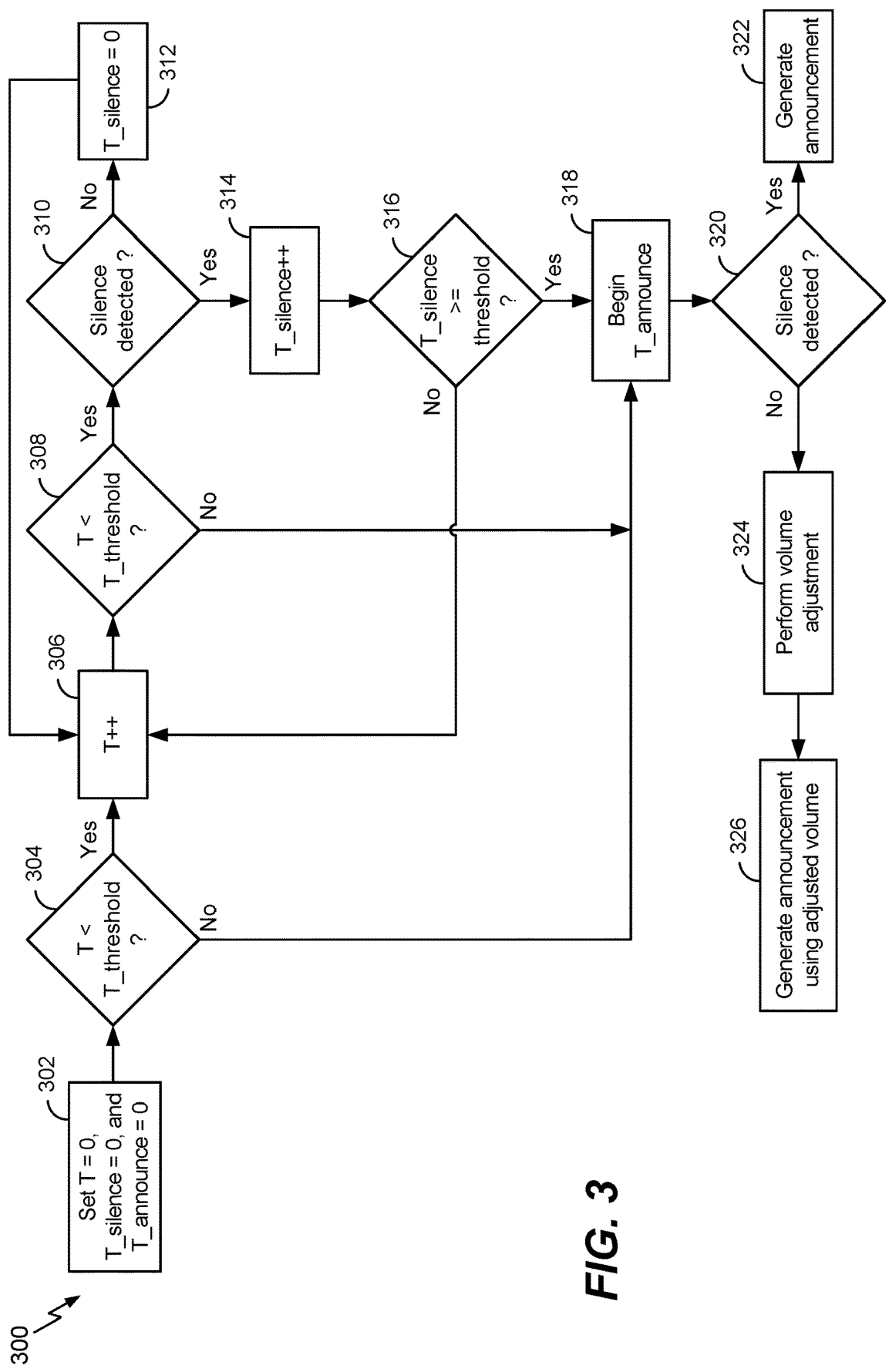
FIG. 3 is a flow chart of another illustrative example of a method of operation of a communication device of the system of FIG. 1.

Referring to FIG. 3, another particular example of a method operation of a communication device is depicted and generally designated 300. In a particular example, operations of the method 300 are performed by the first communication device 110 of FIG. 1 (e.g., a mobile communication device). In some examples, one or more operations of the method 300 are initiated, performed, or controlled by the processor 144 of FIG. 1.

The method 300 includes performing an initialization operation to initialize a plurality of variables, at 302. In the example of FIG. 3, the plurality of variables includes T, T_silence, and T_announce, and the initialization operation includes setting T=0, T_silence=0, and T_announce=0. In a particular example, T indicates an amount of time since receipt of the indication 168 of the second call from the third communication device 170. In a particular example, T is initialized to zero upon receiving the indication 168 by the first communication device 110. In a particular example, the initialization operation is performed during the first call between the communication devices 110, 164 and in response to receiving the indication 168 of the second call from the third communication device 170.

The method 300 further includes performing a first determination of whether T is less than T_threshold, at 304. In a particular example, T_threshold corresponds to a duration of the timing window 146. As a non-limiting example, in some implementations, T_threshold has a duration of 15 seconds. In other examples, T_threshold can have a different duration.

In response to determining that T is less than T_threshold (at 304), the method 300 further includes incrementing T, at 306, and performing a second determination (after incrementing T) of whether T is less than T_threshold, at 308.

In response to determining that T is greater than or equal to T_threshold (at 304 or at 308), the method 300 further includes beginning T_announce, at 318. As an example, beginning T_announce may include adjusting a value of T_announce (e.g., from zero to one). In some examples, T_announce corresponds to a flag stored in a configuration register of the first communication device 110. A value of the flag may indicate whether an announcement (e.g., the audio message 142) is to be played at the first communication device 110. For example, a zero value of the flag may indicate that no announcement is scheduled to be played, and a one value of the flag may indicate that the announcement is scheduled to be played.

Alternatively, in response to determining that T is less than T_threshold (at 308), the method 300 further includes performing a first silence detection operation, at 310. For example, the first communication device 110 may monitor the first call with the second communication device 164 for a pause in speech of at least the threshold duration 186, such as by detecting the one or more SIDs 167 or by monitoring the microphone bus 138, the speaker bus 141, or the transceiver bus 156, as illustrative examples.

If no silence is detected (at 310), then the method 300 includes setting T_silence to zero, at 312. Alternatively, in response to detecting silence (at 310), the method 300 includes incrementing T_silence, at 314, and determining whether T_silence is greater than or equal to a threshold, at 316. As a non-limiting example, in some implementations, the threshold corresponds to a duration of three seconds. In other examples, the threshold can correspond to a different duration.

The method 300 further includes performing a second silence detection operation, at 320. For example, the first communication device 110 may monitor the first call with the second communication device 164 for a pause in speech of at least the threshold duration 186, such as by detecting the one or more SIDs 167 or by monitoring the microphone bus 138, the speaker bus 141, or the transceiver bus 156, as illustrative examples. If silence is detected (at 320), the method 300 further includes generating an announcement, at 322. In some examples, generating the announcement includes playing the audio message 142 using a first volume setting.

Alternatively, if silence is not detected (at 320), the method 200 further includes performing a volume adjustment, at 324. For example, the first communication device 110 may adjust the first volume setting to a second volume setting that is less than the first volume setting.

The method 300 further includes generating the announcement using the adjusted volume setting, at 326. For example, generating the announcement includes playing the audio message 142 using a second volume setting.

One or more examples described with reference to the method 300 of FIG. 3 improve user experience during a call. For example, by delaying announcing call information until silence is detected in the first call, interruption of an ongoing conversation in the first call is reduced or avoided. As another example, generating an announcement using an adjusted volume setting may reduce or avoid disturbing participants of the first call.

Figure 4:
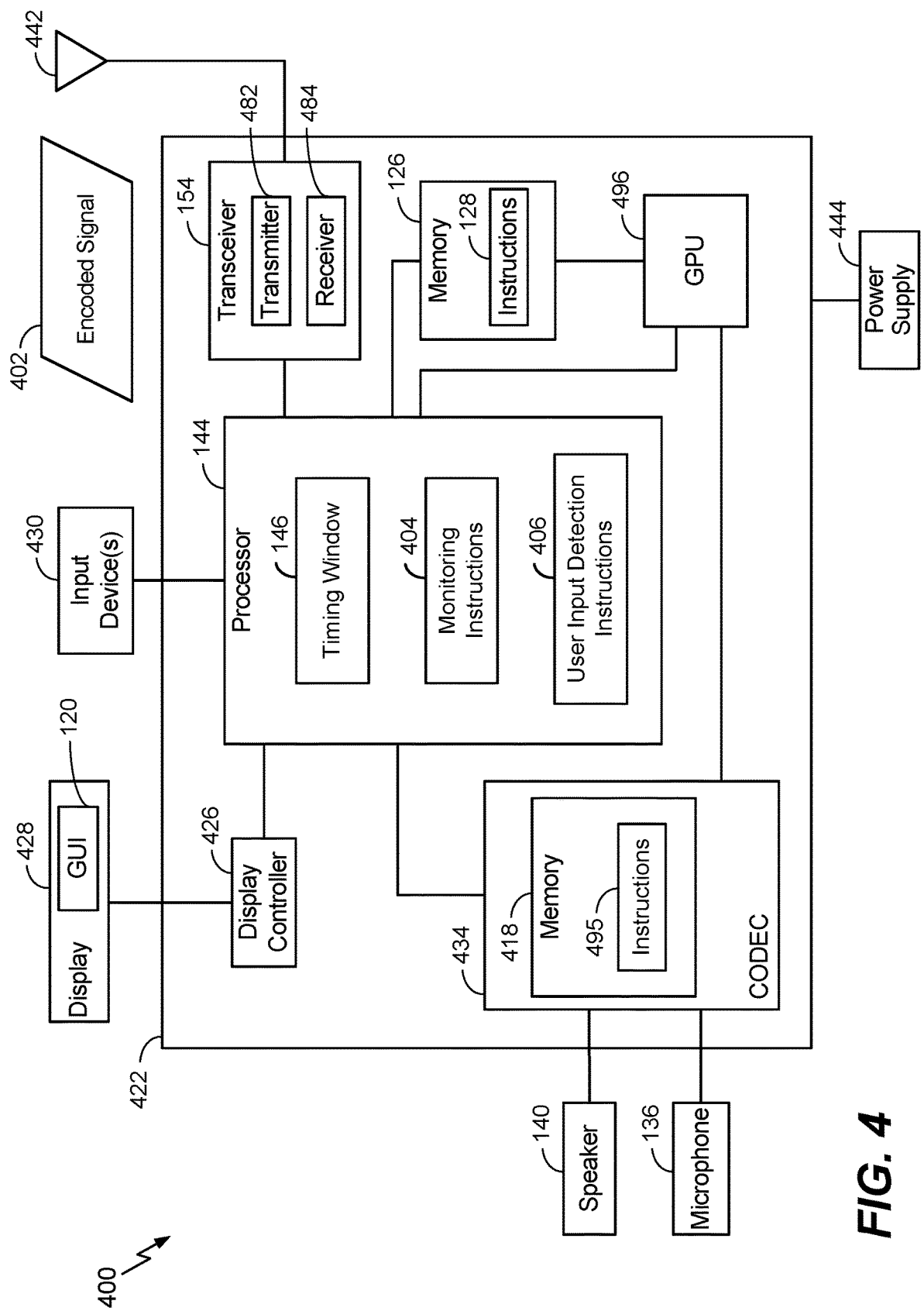
FIG. 4 is a block diagram of an illustrative example of an electronic device, such as an electronic device included in the system of FIG. 1.

Referring to FIG. 4, a block diagram of a particular illustrative example of an electronic device is depicted and generally designated 400. In a particular example, the electronic device 400 corresponds to the first communication device 110. Alternatively or in addition, one or more aspects of the electronic device 400 may correspond to the second communication device 164, the third communication device 170, or both.

In an illustrative example, the electronic device 400 corresponds to a mobile device (e.g., a cellular phone). Alternatively or in addition, one or more aspects of the electronic device 400 may be implemented within a computer (e.g., a server, a laptop computer, a tablet computer, or a desktop computer), an access point, a base station, a wearable electronic device (e.g., a personal camera, a head-mounted display, or a watch), a vehicle (e.g., within a control system or a console), an autonomous vehicle (e.g., a robotic car or a drone), a home appliance, a set top box, an entertainment device, a navigation device, a personal digital assistant (PDA), a television, a monitor, a tuner, a radio (e.g., a satellite radio), a music player (e.g., a digital music player or a portable music player), a video player (e.g., a digital video player, such as a digital video disc (DVD) player or a portable digital video player), a robot, a healthcare device, a virtual reality (VR) device, an augmented reality (AR) device, another electronic device, or a combination thereof.

The electronic device 400 includes one or more processors, such as the processor 144 and a graphics processing unit (GPU) 496. The processor 144 may include a central processing unit (CPU), a digital signal processor (DSP), another processing device, or a combination thereof.

The electronic device 400 may further include one or more memories, such as the memory 126. The memory 126 may be coupled to the processor 144, to the GPU 496, or to both. The memory 126 may include random access memory (RAM), magnetoresistive random access memory (MRAM), flash memory, read-only memory (ROM), programmable read-only memory (PROM), erasable programmable read-only memory (EPROM), electrically erasable programmable read-only memory (EEPROM), one or more registers, a hard disk, a removable disk, a compact disc read-only memory (CD-ROM), another memory device, or a combination thereof.

The memory 126 may store the instructions 128. The instructions 128 may be executable by the processor 144, by the GPU 496, or by both. The instructions 128 may be executable to perform, initiate, or control one or more operations described herein, such as one or more operations described with reference to the method 200, one or more operations described with reference to the method 300, or a combination thereof. In a particular example, the processor 144 is configured to execute monitoring instructions 404 and user input detection instructions 406 to perform, initiate, or control one or more operations described herein, such as one or more operations described with reference to the method 200, one or more operations described with reference to the method 300, or a combination thereof.

A coder/decoder (CODEC) 434 can also be coupled to the processor 144. The CODEC 434 may be coupled to one or more microphones, such as the microphone 136. The CODEC 434 may include a memory 418. The memory 418 may store instructions 495 executable by the CODEC 434. In a particular example, the microphone 136 and the speaker 140 are coupled to the CODEC 434.

FIG. 4 also shows a display controller 426 that is coupled to the processor 144 and to the display 428. In a particular example, the display 428 is configured to present the GUI 120.

The electronic device 400 may further include a transmitter 482 coupled to an antenna 442. The transmitter 482 may be configured to transmit an encoded signal 402 (e.g., to the second communication device 164 or to the third communication device 170). In a particular example, the encoded signal 402 includes or corresponds to the first call data 166 of FIG. 1. In another example, the encoded signal 402 includes or corresponds to the message 182 of FIG. 1. Alternatively or in addition, the electronic device 400 may include a receiver 484 configured to receive the encoded signal 402 (e.g., from the second communication device 164 or from the third communication device 170). The receiver 484 may be coupled to the antenna 442, to one or more other antennas, or a combination thereof. In the example of FIG. 4, the transmitter 482 and the receiver 484 are included in the transceiver 154.

In a particular example, the processor 144, the GPU 496, the memory 126, the display controller 426, the CODEC 434, and the transceiver 154 are included in a system-on-chip (SoC) device 422. Further, one or more input devices 430 (e.g., the power button 122, the fingerprint sensor button 124, or both) and a power supply 444 may be coupled to the SoC device 422. Moreover, in a particular example, as illustrated in FIG. 4, the display 428, the one or more input devices 430, the speaker 140, the microphone 136, the antenna 442, and the power supply 444 are external to the SoC device 422. However, each of the display 428, the one or more input devices 430, the speaker 140, the microphone 136, the antenna 442, and the power supply 444 can be coupled to a component of the SoC device 422, such as to an interface or to a controller.

Figure 5:
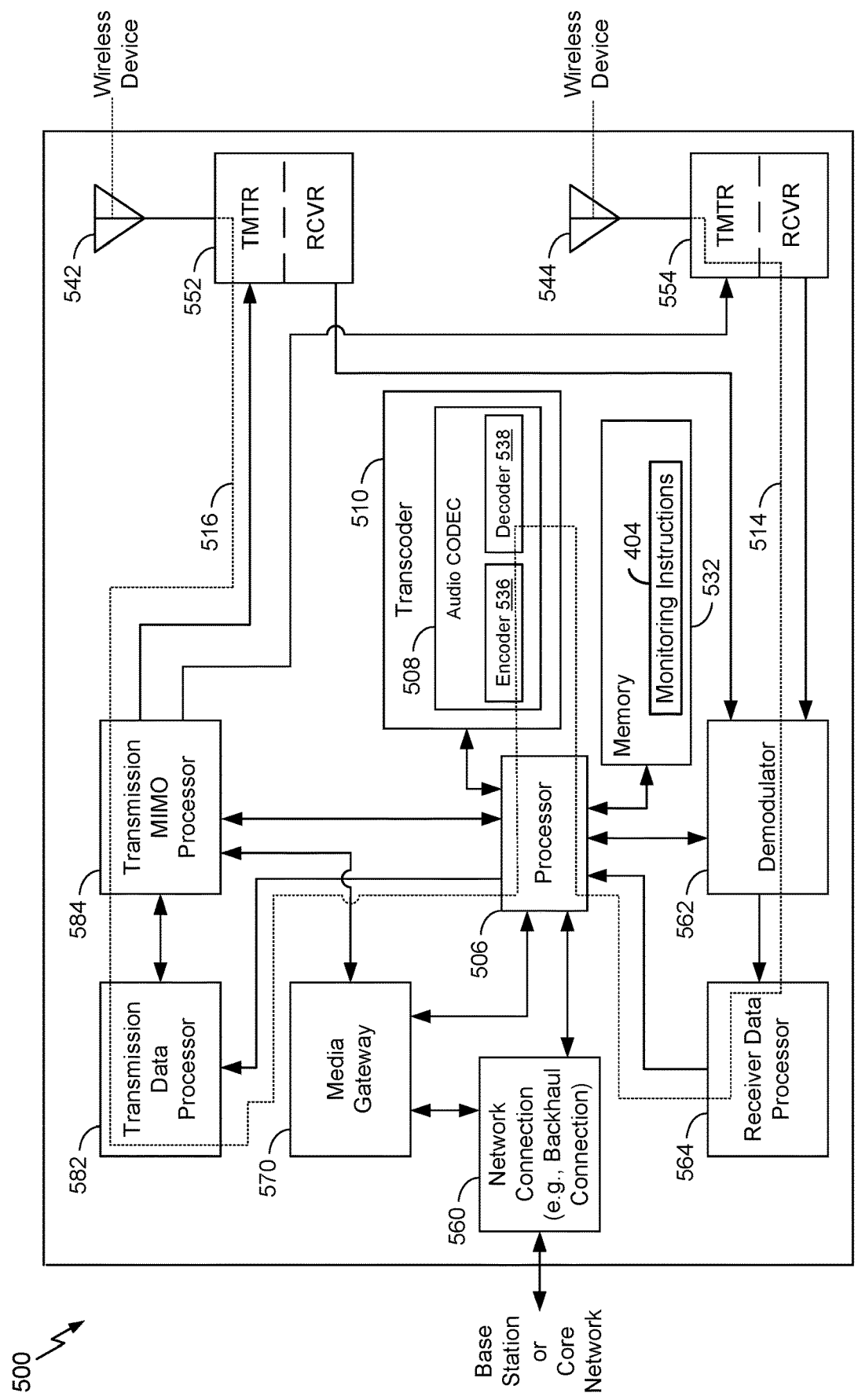
FIG. 5 is a block diagram of an illustrative example of a base station that may be included in the system of FIG. 1.

Referring to FIG. 5, a block diagram of a particular illustrative example of a base station 500 is depicted. In various implementations, the base station 500 may have more components or fewer components than illustrated in FIG. 5. In some examples, the base station 500 is included in or is configured to control certain operations of the network 180 of FIG. 1.

In some implementations, the base station 500 may communicate with any of the communication devices 110, 164, and 170 (e.g., via the network 180). As a particular example, the network 180 may include a cellular network controlled or accessed by the base station 500.

The base station 500 may be part of a wireless communication system. The wireless communication system may include multiple base stations and multiple wireless devices. The wireless communication system may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1x, Evolution-Data Optimized (EVDO), Time Division Synchronous CDMA (TD-SCDMA), or some other version of CDMA.

In certain implementations, one or more wireless devices (e.g., any of the communication devices 110, 164, and 170) of the wireless communication system may also be referred to as user equipment (UE), a mobile station, a terminal, an access terminal, a subscriber unit, a station, etc. The wireless devices may include a cellular phone, a smartphone, a tablet, a wireless modem, a personal digital assistant (PDA), a handheld device, a laptop computer, a smartbook, a netbook, a tablet, a cordless phone, a wireless local loop (WLL) station, a Bluetooth device, etc.

Various functions may be performed by one or more components of the base station 500 (and/or in other components not shown), such as sending and receiving messages and data (e.g., audio data). For example, the base station 500 may be configured to transmit the first call data 166 from the first communication device 110 to the second communication device 164 (or vice versa) during the first call between the first communication device 110 and the second communication device 164. As another example, the base station 500 may be configured to receive the indication 168 of the second call from the third communication device 170 and to send the indication 168 to the first communication device 110. As an additional example, the base station 500 may be configured to receive the message 182 from the first communication device 110 and to send the message 182 to the third communication device 170.

In a particular example, the base station 500 includes a processor 506 (e.g., a CPU). In the example of FIG. 5, the processor 506 may be configured to access the monitoring instructions 404 and to execute the monitoring instructions 404 to detect a pause in conversation of the first call of at least the threshold duration 186.

In some examples, the base station 500 is configured to selectively delay providing the indication 168 of the second call to the first communication device 110 prior to detecting a pause in conversation of the first call of at least the threshold duration 186. The base station 500 may be configured to selectively forward the indication 168 of the second call to the first communication device 110 in response to detecting a pause in conversation of the first call of at least the threshold duration 186.

The base station 500 may include a transcoder 510. The transcoder 510 may include an audio CODEC 508. For example, the transcoder 510 may include one or more components (e.g., circuitry) configured to perform operations of the audio CODEC 508. As another example, the transcoder 510 may be configured to execute one or more computer-readable instructions to perform the operations of the audio CODEC 508. Although the audio CODEC 508 is illustrated as a component of the transcoder 510, in other examples, one or more components of the audio CODEC 508 may be included in the processor 506, another processing component, or a combination thereof. For example, a decoder 538 (e.g., a vocoder decoder) may be included in a receiver data processor 564. As another example, an encoder 536 (e.g., a vocoder encoder) may be included in a transmission data processor 582.

The transcoder 510 may be configured to transcode messages and data between two or more networks. The transcoder 510 may be configured to convert message and audio data from a first format (e.g., a digital format) to a second format. To illustrate, the decoder 538 may decode encoded signals having a first format and the encoder 536 may encode the decoded signals into encoded signals having a second format. Additionally or alternatively, the transcoder 510 may be configured to perform data rate adaptation. For example, the transcoder 510 may downconvert a data rate or upconvert the data rate without changing a format of the audio data. To illustrate, the transcoder 510 may downconvert 64 kilobits per second (kbps) signals into 16 kbps signals.

The audio CODEC 508 may include the encoder 536 and the decoder 538. The encoder 536 may include an encoder selector, a speech encoder, and a non-speech encoder. The decoder 538 may include a decoder selector, a speech decoder, and a non-speech decoder.

The base station 500 may include a memory 532. The memory 532, such as a computer-readable storage device, may include instructions, such as the monitoring instructions 404. The instructions may include one or more instructions that are executable by the processor 506, the transcoder 510, or a combination thereof.

The base station 500 may include multiple transmitters and receivers (e.g., transceivers), such as a first transceiver 552 and a second transceiver 554, coupled to an array of antennas. The array of antennas may include a first antenna 542 and a second antenna 544. The array of antennas may be configured to wirelessly communicate with one or more wireless devices. For example, the second antenna 544 may receive a data stream 514 (e.g., a bit stream) from a wireless device. The data stream 514 may include messages, data (e.g., encoded speech data), or a combination thereof.

The base station 500 may include a network connection 560, such as backhaul connection. The network connection 560 may be configured to communicate with a core network or one or more base stations of the wireless communication network. For example, the base station 500 may receive a second data stream (e.g., messages or audio data) from a core network via the network connection 560. The base station 500 may process the second data stream to generate messages or audio data and provide the messages or the audio data to one or more wireless device via one or more antennas of the array of antennas or to another base station via the network connection 560. In a particular implementation, the network connection 560 may be a wide area network (WAN) connection, as an illustrative, non-limiting example. In some implementations, the core network may include or correspond to a Public Switched Telephone Network (PSTN), a packet backbone network, or both.

The base station 500 may include a media gateway 570 that is coupled to the network connection 560 and the processor 506. The media gateway 570 may be configured to convert between media streams of different telecommunications technologies. For example, the media gateway 570 may convert between different transmission protocols, different coding schemes, or both. To illustrate, the media gateway 570 may convert from PCM signals to Real-Time Transport Protocol (RTP) signals, as an illustrative, non-limiting example. The media gateway 570 may convert data between packet switched networks (e.g., a Voice Over Internet Protocol (VoW) network, an IP Multimedia Subsystem (IMS), a fourth generation (4G) wireless network, such as LTE, WiMax, and UMB, etc.), circuit switched networks (e.g., a PSTN), and hybrid networks (e.g., a second generation (2G) wireless network, such as GSM, GPRS, and EDGE, a third generation (3G) wireless network, such as WCDMA, EV-DO, and HSPA, etc.).

Additionally, the media gateway 570 may include a transcoder, such as the transcoder 510, and may be configured to transcode data when codecs are incompatible. For example, the media gateway 570 may transcode between an Adaptive Multi-Rate (AMR) codec and a G.711 codec, as an illustrative, non-limiting example. The media gateway 570 may include a router and a plurality of physical interfaces. In some implementations, the media gateway 570 may also include a controller (not shown). In a particular implementation, the media gateway controller may be external to the media gateway 570 or to the base station 500. The media gateway controller may control and coordinate operations of multiple media gateways. The media gateway 570 may receive control signals from the media gateway controller and may function to bridge between different transmission technologies and may add service to end-user capabilities and connections.

The base station 500 may include a demodulator 562 that is coupled to the transceivers 552, 554, the receiver data processor 564, and the processor 506. The receiver data processor 564 may be coupled to the processor 506. The demodulator 562 may be configured to demodulate modulated signals received from the transceivers 552, 554 and to provide demodulated data to the receiver data processor 564. The receiver data processor 564 may be configured to extract a message or audio data from the demodulated data and send the message or the audio data to the processor 506.

The base station 500 may include a transmission data processor 582 and a transmission multiple input-multiple output (MIMO) processor 584. The transmission data processor 582 may be coupled to the processor 506 and the transmission MIMO processor 584. The transmission MIMO processor 584 may be coupled to the transceivers 552, 554 and the processor 506. In some implementations, the transmission MIMO processor 584 may be coupled to the media gateway 570. The transmission data processor 582 may be configured to receive the messages or the audio data from the processor 506 and to code the messages or the audio data based on a coding scheme, such as CDMA or orthogonal frequency-division multiplexing (OFDM), as an illustrative, non-limiting examples. The transmission data processor 582 may provide the coded data to the transmission MIMO processor 584.

The coded data may be multiplexed with other data, such as pilot data, using CDMA or OFDM techniques to generate multiplexed data. The multiplexed data may then be modulated (i.e., symbol mapped) by the transmission data processor 582 based on a particular modulation scheme (e.g., binary phase-shift keying (BPSK), quadrature phase-shift keying (QSPK), M-ary phase-shift keying (M-PSK), M-ary quadrature amplitude modulation (M-QAM), etc.) to generate modulation symbols. In a particular implementation, the coded data and other data may be modulated using different modulation schemes. The data rate, coding, and modulation for each data stream may be determined by instructions executed by processor 506.

The transmission MIMO processor 584 may be configured to receive the modulation symbols from the transmission data processor 582 and may further process the modulation symbols and may perform beamforming on the data. For example, the transmission MIMO processor 584 may apply beamforming weights to the modulation symbols. The beamforming weights may correspond to one or more antennas of the array of antennas from which the modulation symbols are transmitted.

During operation, the second antenna 544 of the base station 500 may receive a data stream 514. The second transceiver 554 may receive the data stream 514 from the second antenna 544 and may provide the data stream 514 to the demodulator 562. The demodulator 562 may demodulate modulated signals of the data stream 514 and provide demodulated data to the receiver data processor 564. The receiver data processor 564 may extract audio data from the demodulated data and provide the extracted audio data to the processor 506.

The processor 506 may provide the audio data to the transcoder 510 for transcoding. The decoder 538 of the transcoder 510 may decode the audio data from a first format into decoded audio data and the encoder 536 may encode the decoded audio data into a second format. In some implementations, the encoder 536 may encode the audio data using a higher data rate (e.g., upconvert) or a lower data rate (e.g., downconvert) than received from the wireless device. In other implementations the audio data may not be transcoded. Although transcoding (e.g., decoding and encoding) is illustrated as being performed by a transcoder 510, the transcoding operations (e.g., decoding and encoding) may be performed by multiple components of the base station 500. For example, decoding may be performed by the receiver data processor 564 and encoding may be performed by the transmission data processor 582. In other implementations, the processor 506 may provide the audio data to the media gateway 570 for conversion to another transmission protocol, coding scheme, or both. The media gateway 570 may provide the converted data to another base station or core network via the network connection 560.

The decoder 538 and the encoder 536 may select a corresponding decoder (e.g., a speech decoder or a non-speech decoder) and a corresponding encoder to transcode (e.g., decode and encode) the frame. The decoder 538 and the encoder 536 may determine, on a frame-by-frame basis, whether each received frame of the data stream 514 corresponds to a narrowband frame or a wideband frame and may select a corresponding decoding output mode (e.g., a narrowband output mode or a wideband output mode) and a corresponding encoding output mode to transcode (e.g., decode and encode) the frame. Encoded audio data generated at the encoder 536, such as transcoded data, may be provided to the transmission data processor 582 or the network connection 560 via the processor 506.

The transcoded audio data from the transcoder 510 may be provided to the transmission data processor 582 for coding according to a modulation scheme, such as OFDM, to generate the modulation symbols. The transmission data processor 582 may provide the modulation symbols to the transmission MIMO processor 584 for further processing and beamforming. The transmission MIMO processor 584 may apply beamforming weights and may provide the modulation symbols to one or more antennas of the array of antennas, such as the first antenna 542 via the first transceiver 552. Thus, the base station 500 may provide a transcoded data stream 516, that corresponds to the data stream 514 received from the wireless device, to another wireless device. The transcoded data stream 516 may have a different encoding format, data rate, or both, than the data stream 514. In other implementations, the transcoded data stream 516 may be provided to the network connection 560 for transmission to another base station or a core network.

In conjunction with the described embodiments, a computer-readable medium (e.g., the memory 126) stores instructions (e.g., any of the instructions 128, the monitoring instructions 404, or the user input detection instructions 406) executable by one or more processors (e.g., the processor 144) to perform operations. The operations include receiving, during a first call between a first communication device (e.g., the first communication device 110) and a second communication device (e.g., the second communication device 164), an indication (e.g., the indication 168) of a second call from a third communication device (e.g., the third communication device 170). The operations further include monitoring the first call, in response to the indication of the second call, for a pause (e.g., the pause 162 or the pause 178) in speech of at least a threshold duration (e.g., the threshold duration 186). The operations further include generating, in response to detecting the pause in speech of at least the threshold duration, an audio message (e.g., the audio message 142) indicating call information (e.g., the call information 134) associated with the second call.

In conjunction with the described embodiments, an apparatus includes means (e.g., the transceiver 154) for receiving, during a first call between a first communication device (e.g., the first communication device 110) and a second communication device (e.g., the second communication device 164), an indication (e.g., the indication 168) of a second call from a third communication device (e.g., the third communication device 170). The apparatus further includes means (e.g., the processor 144) for monitoring, in response to the indication of the second call, the first call for a pause (e.g., the pause 162 or the pause 178) in speech of at least a threshold duration (e.g., the threshold duration 186). The apparatus further includes means (e.g., the speaker 140) for generating, in response to detecting the pause in speech of at least the threshold duration, an audio message (e.g., the audio message 142) indicating call information (e.g., the call information 134) associated with the second call.

As used herein, "coupled" may include communicatively coupled, electrically coupled, magnetically coupled, physically coupled, optically coupled, and combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc.

As used herein, "generating," "calculating," "using," "selecting," "accessing," and "determining" may be used interchangeably. For example, "generating," "calculating," or "determining" a value, a characteristic, a parameter, or a signal may refer to actively generating, calculating, or determining a value, a characteristic, a parameter, or a signal or may refer to using, selecting, or accessing a value, a characteristic, a parameter, or a signal that is already generated, such as by a component or a device.

The foregoing disclosed devices and functionalities may be designed and represented using computer files (e.g. RTL, GDSII, GERBER, etc.). The computer files may be stored on computer-readable media. Some or all such files may be provided to fabrication handlers who fabricate devices based on such files. Resulting products include wafers that are then cut into die and packaged into integrated circuits (or "chips"). The integrated circuits are then employed in electronic devices, such as the communication devices 110, 164, and 170 of FIG. 1, the electronic device 400 of FIG. 4, and the base station 500 of FIG. 5.

The various illustrative logical blocks, configurations, modules, circuits, and algorithm steps described in connection with the examples disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

One or more operations of a method or algorithm described herein may be embodied directly in hardware, in a software module executed by a processor, or in a combination of the two. For example, one or more operations of the methods 200 and 300 may be initiated, controlled, or performed by a field-programmable gate array (FPGA) device, an application-specific integrated circuit (ASIC), a processing unit such as a central processing unit (CPU), a digital signal processor (DSP), a controller, another hardware device, a firmware device, or a combination thereof. A software module may reside in random access memory (RAM), magnetoresistive random access memory (MRAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed examples is provided to enable a person skilled in the art to make or use the disclosed examples. Various modifications to these examples will readily apparent to those skilled in the art, and the principles defined herein may be applied to other examples without departing from the scope of the disclosure. Thus, the present disclosure is not intended to be limited to the examples shown herein but is to be accorded the widest scope possible consistent with the principles and novel features as defined by the following claims.

What is claimed is:

1. A first communication device comprising:
 a memory; and
 a processor coupled to the memory and configured to:
  receive, during a first call with a second communication device, an indication of a second call from a third communication device;
  in response to the indication of the second call, monitor the first call for a pause in speech of at least a threshold duration; and
  in response to detecting the pause in speech of at least the threshold duration, initiate an audio message indicating call information associated with the second call.

2. The first communication device of claim 1, wherein the processor is further configured to delay providing the call information until detection of the pause in speech.

3. The first communication device of claim 1, wherein the processor is further configured to decline the second call in response to failing to detect the pause in speech within a timing window and without providing the call information during the first call.

4. The first communication device of claim 1, further comprising a microphone coupled to the processor, wherein the processor is further configured to monitor a microphone bus coupled to the microphone to detect the pause in speech.

5. The first communication device of claim 1, further comprising a speaker coupled to the processor, wherein the processor is further configured to monitor a speaker bus coupled to the speaker to detect the pause in speech.

6. The first communication device of claim 1, further comprising a transceiver coupled to the processor, wherein the processor is further configured to monitor a transceiver bus coupled to the transceiver to detect the pause in speech.

7. The first communication device of claim 1, wherein the processor is further configured to detect first user input after initiating the audio message and to send, based on the first user input, a message to the third communication device requesting a callback in a particular amount of time.

8. The first communication device of claim 7, wherein the first user input corresponds to a first number of taps of a multi-tap gesture, wherein the processor is further configured to determine the particular amount of time by multiplying the first number by a second number that is a positive number, and wherein the multi-tap gesture corresponds to an action by a user using one or more fingers to perform one or more gestures including multiple finger taps to the first communication device.

9. The first communication device of claim 1, wherein the processor is further configured to detect second user input after initiating the audio message and to decline the second call based on the second user input.

10. The first communication device of claim 9, further comprising a power button coupled to the processor, wherein the second user input corresponds to a press of the power button.

11. The first communication device of claim 1, wherein the processor is further configured to detect third user input after initiating the audio message and to accept the second call based on the third user input.

12. The first communication device of claim 11, further comprising a fingerprint sensor button coupled to the processor, wherein the third user input corresponds to a press of the fingerprint sensor button.

13. The first communication device of claim 1, further comprising:
an antenna; and
a transmitter coupled to the antenna and configured to transmit an encoded signal.

14. The first communication device of claim 13, wherein the first communication device corresponds to a mobile communication device that includes the antenna, the transmitter, the memory, and the processor.

15. A method of operation of a communication device, the method comprising:
receiving, during a first call between a first communication device and a second communication device, an indication of a second call from a third communication device;
in response to the indication of the second call, monitoring the first call for a pause in speech of at least a threshold duration; and
in response to detecting the pause in speech of at least the threshold duration, generating an audio message indicating call information associated with the second call.

16. The method of claim 15, wherein monitoring the first call includes monitoring a microphone bus coupled to a microphone to detect the pause in speech.

17. The method of claim 15, wherein monitoring the first call includes monitoring a speaker bus coupled to a speaker to detect the pause in speech.

18. The method of claim 15, wherein monitoring the first call includes monitoring a transceiver bus coupled to a transceiver to detect the pause in speech.

19. The method of claim 15, further comprising:
detecting first user input after initiating the audio message; and
sending, based on the first user input, a message to the third communication device requesting a callback in a particular amount of time.

20. The method of claim 19, wherein the first user input corresponds to a first number of taps of a multi-tap gesture, and wherein determining the particular amount of time includes multiplying the first number by a second number that is a positive number.

21. The method of claim 15, further comprising:
detecting second user input after initiating the audio message; and
declining the second call based on the second user input.

22. The method of claim 21, wherein the second user input corresponds to a press of a power button.

23. The method of claim 15, further comprising:
detecting third user input after initiating the audio message; and
accepting the second call based on the third user input.

24. The method of claim 23, wherein the third user input corresponds to a press of a fingerprint sensor button.

25. The method of claim 15, wherein the first communication device corresponds to a mobile communication device.

26. A non-transitory computer-readable medium storing instructions executable by one or more processors to perform operations, the operations comprising:
receiving, during a first call between a first communication device and a second communication device, an indication of a second call from a third communication device;
in response to the indication of the second call, monitoring the first call for a pause in speech of at least a threshold duration; and
in response to detecting the pause in speech of at least the threshold duration, generating an audio message indicating call information associated with the second call.

27. The non-transitory computer-readable medium of claim 26, wherein detecting the pause in speech includes one or more of monitoring a microphone bus coupled to a microphone, monitoring a speaker bus coupled to a speaker, or monitoring a transceiver bus coupled to a transceiver for the pause in speech.

28. The non-transitory computer-readable medium of claim 26, wherein the operations are performed at a mobile communication device corresponding to the first communication device.

29. An apparatus comprising:
means for receiving, during a first call between a first communication device and a second communication device, an indication of a second call from a third communication device;
means for monitoring, in response to the indication of the second call, the first call for a pause in speech of at least a threshold duration; and
means for generating, in response to detecting the pause in speech of at least the threshold duration, an audio message indicating call information associated with the second call.

30. The apparatus of claim 29, wherein the means for receiving, the means for monitoring, and the means for generating are included in a mobile communication device corresponding to the first communication device.

* * * * *